INVENTOR.
DONALD I. GONSER
BY
Donnelly, Mentag & Harrington
ATTORNEYS

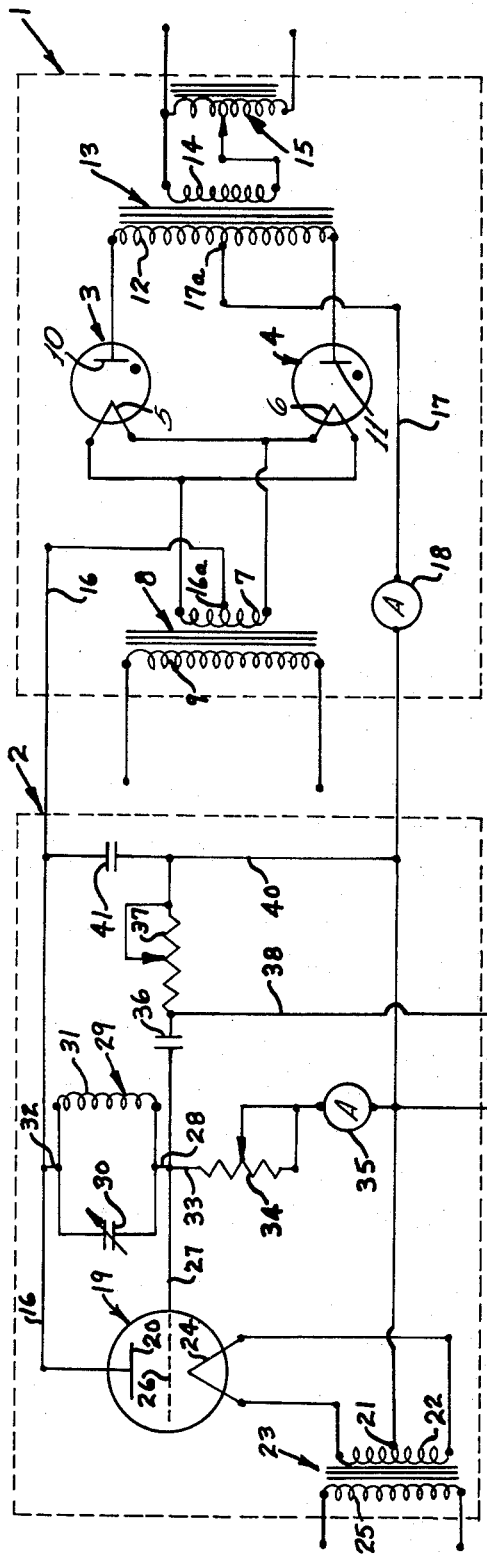
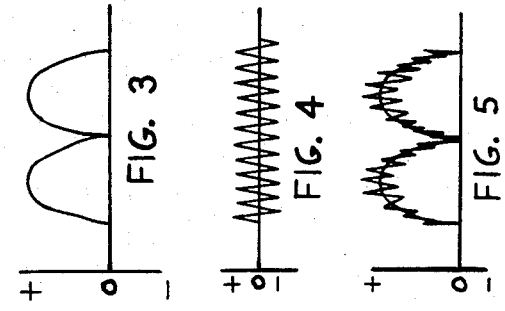
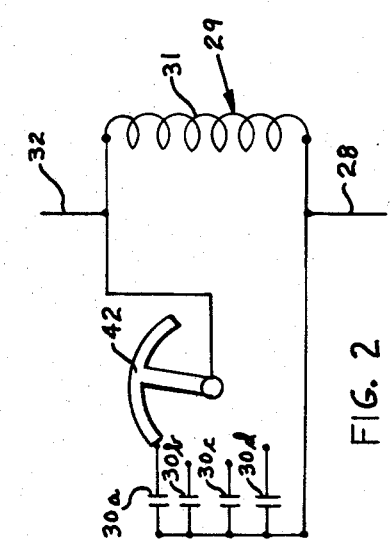
April 12, 1966  D. I. GONSER  3,245,408
ELECTROTHERAPY APPARATUS
Filed April 8, 1964  7 Sheets-Sheet 1
INVENTOR.
DONALD I. GONSER
BY Donnelly, Montag & Harrington
ATTORNEYS

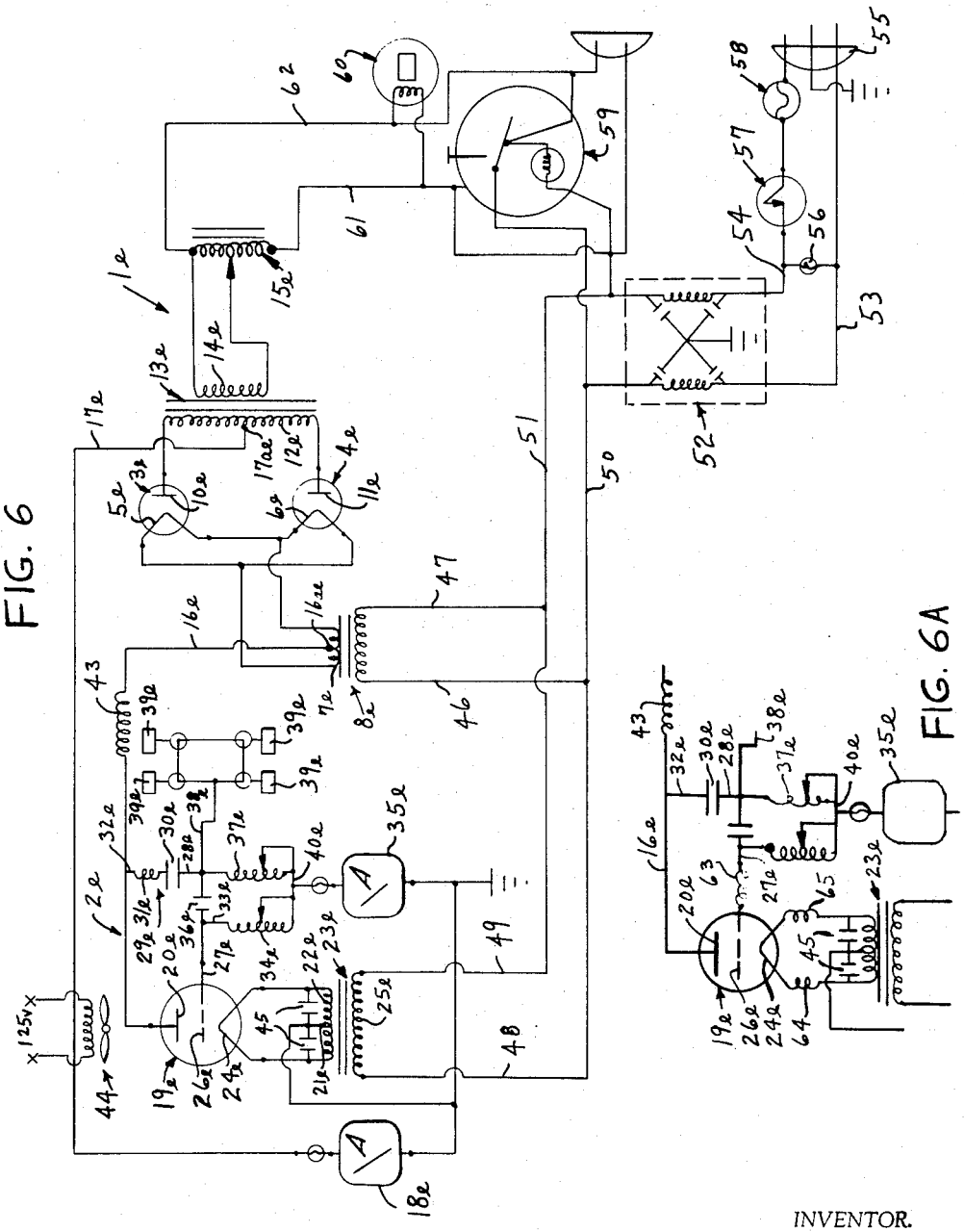

April 12, 1966   D. I. GONSER   3,245,408
ELECTROTHERAPY APPARATUS
Filed April 8, 1964   7 Sheets-Sheet 4

INVENTOR.
DONALD I. GONSER
BY
Donnelly, Montag & Harrington
ATTORNEYS

April 12, 1966

D. I. GONSER 3,245,408

ELECTROTHERAPY APPARATUS

Filed April 8, 1964

INVENTOR.
DONALD I. GONSER
BY
Donnelly, Mentag & Harrington
ATTORNEYS

INVENTOR.
DONALD I. GONSER
BY
Donnelly, Montag & Harrington
ATTORNEYS

April 12, 1966 D. I. GONSER 3,245,408
ELECTROTHERAPY APPARATUS
Filed April 8, 1964 7 Sheets-Sheet 7

INVENTOR.
DONALD I. GONSER
BY
Donnelly, Mentag & Harrington
ATTORNEYS

United States Patent Office 3,245,408
Patented Apr. 12, 1966

3,245,408
ELECTROTHERAPY APPARATUS
Donald I. Gonser, 1120 Brentwood Lane,
Mount Prospect, Ill.
Filed Apr. 8, 1964, Ser. No. 358,233
11 Claims. (Cl. 128—422)

This is a continuation-in-part application of my prior application Serial No. 620,482, filed November 5, 1956.

This invention relates to electrotherapy apparatus of the kind adapted to discharge radio frequency radiations into a patient to stimulate glandular activity and for other purposes.

It is well known that persons subjected to radio frequency radiations experience an increase in endocrine glandular activity and that stimulation of certain glands provides relief to persons suffering from a number of ailments. The full effects of radio frequency radiation are not completely known, but a great number of arthritic patients have experienced relief from such treatment. Not all patients, however, can be subjected to identical treatments, either with respect to duration of treatment or intensity of radiation. Machines of known construction are not believed to be sufficiently flexible in use to permit optimum results to be obtained upon patients requiring varying degrees of treatment. Moreover, some machines are likely to subject a patient to severe and harmful electrical shocks and/or radio frequency burns in the event of electrical failure of parts of such machines, or by misuse on the part of the operator.

Early in the 1930's, the standard diathermy apparatus became very popular with the medical profession as a significant method for the application of therapeutic heat. The use of high frequency continuous diathermy electric currents served to supply sufficient radio frequency energy to the body and to raise the tissues to a desired temperature. The process of applied continuous radio frequency currents resulted in therapeutic value to a patient through the phenomenon of high frequency currents conducting in tissue in which the application resulted in rather uniform volumetric heating of the tissue masses.

The value of the diathermy method is to get the desired tissue volume heating, and is accomplished by the application of a continuous supply of radio frequency currents to the area under treatment. Continuous diathermy heating is generated in tissue by the laws of thermodynamics as a result of the losses generated by the currents as they are passed through the body tissue structures.

During the early period when continuous diathermy apparatus was in rather wide use, Ginsberg (A. J. Ginsberg, discoverer and developer of the first Single Pulse Radio Frequency Generator used for therapeutic purposes), hypothesized, that radio frequency stimulation could be of therapeutic value if the heating effects experienced with continuous diathermy apparatus could be eliminated, or at the least be reduced to an insignificant part of the treatment. Ginsberg predicted that the contra-indications and deleterious side effects experienced with the use of standard diathermy would be eliminated if a system could be developed where the currents themselves would be the only stimulatory constituent as they passed through the tissues.

The hypothesis was proven when Ginsberg developed a practical device utilizing a single radio frequency causing currents to pass into tissue without excessive heating. To acomplish this specific effect, the Ginsberg apparatus was pulsed. The energy was "pulsed" for a short period of time and "turned off" for a much longer period of time, thus allowing for the dissipation of heat accumulation created during the period of time the apparatus caused currents to conduct in the biological media. The Ginsberg apparatus was designed so that the pulses appeared anywhere from less than 100 times per second to several hundred times per second. Ginsberg and his co-workers set out to prove in the 1930's that this new form of pulsed radio frequency energy was beneficial and therapeutic to animals and the human body.

Over a period of several years the value of the Ginsberg apparatus was established by use, and when the pulsed energy was directed into various organs of the body it was demonstrated that specific beneficial therapeutic effects were obtainable. Stimulation to the body host defense mechanism was demonstrated when the liver, spleen, and adrenals, were treated. An increase in peripheral blood flow, without vasodilation was observed when the area over the epigastrium was treated. Relaxation of smooth and skeletal muscles occurred when various local areas were treated. Acceleration of wound healing was observed when the wound area and host defense mechanism was treated. During the many years of investigation, using pulsed energy, no contra-indications were noted.

The attempts to arrive at the proper relationships of "on periods" and "off periods" for the Ginsberg apparatus were successful. To get the desired stimulation, the pulsed power required to provide the single radio frequency apparatus often exceeded 1,000 watts during the pulse period to get the desired penetration of relatively small areas of less than one square foot of body tissue. Because of the excessively strong high frequency electric field required to get tissue penetration and stimulation, the ratio of the pulse length of time to the thermal dissipation period required that the "on" period not exceed 65 microseconds and that it should be followed immediately by an "off" period of 1.67 milliseconds.

I have determined that an uneconomically large generator is required to get stimulation to several areas of the body at the same time when a single pulsed frequency generator is used. Also, very strong pulsed electric fields would not be required if the natural behavior of pulsed radio frequency energy fields in tissue, at various frequencies, could be taken advantage of, and that a much lower power pulsed energy field may be utilized to get the currents to flow around the cell in the electrolytes, in the cell, and at a sub-cell level. Hence, equalization of the currents in the tissue structure under treatment would result. The apparatus of the present invention provides the same non-thermal stimulatory effects, with low power pulsed multiple radio frequency energy, as the apparatus using a single frequency and a high level of radio frequency pulsed power. The studies on the behavior of radio frequency energy as it conducts in tissue, as shown by Schwan (H. P. Schwan, electrical properties of tissue and cell suspensions, in J. Lawrence and C. Tobias, Advances in Biological and Medical Physics, volume V, New York, 1957), and other authorities, identify that the significant frequencies should range between 1.0 megacycle and 1,000 megacycles to cause penetration and saturation in the biological media, with high frequency currents, within the tissue structures and the cells, and at a sub-cell level. Studies on the electrical properties of tissues demonstrate a pronounced change in both dielectric constant and specific resistance centered about 300 megacycles. Below 300 megacycles the cell membranes tend to prevent the currents from passing into the cell interior and the currents pass through the electrolytes around the cell body. Above 300 megacycles the cell membranes are short circuited and cause the currents to conduct into the cell interior.

I have further determined that there is a degree of frequency dependence because of the complex structures of cell size and volume concentration which alters the electrical characteristics of each cell and structure. I have also determined that since there is the presence of many pulsed frequencies which causes the radio frequency currents to conduct in the body tissue at lower power levels, the method of application could be greatly simplified over the high power single frequency pulsed apparatus, by placing therapy electrodes on the various body structures. More of the energy then can be concentrated in various tissues for maximum stimulation (such as the liver, adrenals, spleen, etc). However, since the energy is distributed throughout the tissue structures, there would result a general stimulation to the body as the treatment is given, regardless of the particular method of application used for the treatment. Clinical testing with the pulsed multiple radio frequency generator of the present invention has proven the effectiveness and efficiency of the method in clinical application.

The apparatus of the present invention generates radio frequency energy having the following characteristics: a complete spectrum of radio frequencies ranging from 200 kilocycles to 1,000 megacycles; and, the spectrum range occurs 120 times a second; a peak power is 20 watts; average power is 10 watts; and, the ratio of off-to-on time is 1 to 1.

The simultaneous application of a wide range of radio frequency currents (200 kilocycles through 1,000 megacycles) results in effective radio frequency current distribution in the tissues and electrolytic solutions of the body. The radio frequency field strength can be reduced far below the limits of physiological tolerance to a point where the currents do not produce consequential thermal effects. Pulsing the energy allows for the dissipation of thermal accumulation which is caused by the currents.

The therapeutic value of pulsed multiple frequency energy distributed between 200 kilocycles and 1,000 megacycles has established that radio frequency currents pass into the tissues, the cell, and at a sub-cell level based on the natural electrical characteristics of each structure, and that once the currents penetrate through the structures, saturation of currents occur, causing beneficial therapeutic stimulation to the biological processes as has been demonstrated on the basis of controlled clinical studies.

The conditions caused by the biological media effecting the passage of electrical currents as they are coupled to the specific tissue structure, are as follows:

(1) The necessary frequencies to permit passage of the current through the cell (sub-cell level).

(2) The necessary frequencies to pass the current within the electrolytes surrounding the cell (tissue structure level).

The electrical properties of human organs at various frequencies are demonstrated in tables set forth hereinafter. They illustrate the decrease in tissue resistance with an increase of frequency. The dielectric permeability and conductivity increase as the frequency is increased. One of the tables illustrates the specific resistances of tissues at various frequencies. The specific resistance table disclosed hereinafter illustrates that the poorer conductors, such as fat and bone marrow, have the highest electrical resistances. The better electrical conductors, such as muscle, liver, brain and spleen, have the lowest electrical resistances by comparison for a given frequency.

The currents which will pass into the tissue structures will not pass necessarily through the cell membrane and into the cell interior, unless the frequency of the current is 300 megacycles or above. Those frequencies below 300 megacycles will pass through the electrolytes and some of the energy may "press" through the cell membrane by way of the "access" resistors of the cell membrane, thereby, electrically charging the cell interior, as illustrated hereinafter.

Frequencies below 300 megacycles comprise part of the transition region which separates the "low" and "high" frequency resistance. At these lower frequencies each cycle is sufficiently long to permit charging the cell membranes by means of the "access" resistances provided by the ionic media located along the surface of the cell membrane. Above 300 megacycles, insufficient time is provided during each cycle, to press through the access resistors all of the electricity necessary to charge the membranes. The cell membranes then cease to influence tissue electrical properties. Therefore, tissue must appear, from a dielectric point of view, simply as a salt solution containing solid components in suspension, as the currents pass through the media.

The use of pulsed multiple frequencies has been shown by controlled clinical testing to be of significant therapeutic value. The biophysics phenomenon explains the behavior characteristics of electrical currents at various frequencies of the radio frequency spectrum as they are passed through the cells and the tissues.

An object of this invention is to provide an electrotherapy apparatus utilizing low voltage, low pulse rate frequency, and which modulates the radio frequency voltage to cause penetration of a patient's tissues with radio frequency currents.

Another object of the invention is to provide an electrotherapeutic apparatus in which the frequency of the radiations may be changed quickly and easily.

Another object of the invention is to provide such apparatus in which the modulating voltage may be changed.

A further object of the invention is to provide apparatus of the kind referred to which is so constructed and arranged as to prevent harmful electrical shocks or burns to the patient receiving therapy.

It is still another object of the invention to provide an angular modulated broad band frequency generator adapted for use as an electrotherapeutic apparatus in medical practice to apply to a patient's body a complete spectrum of radio frequencies to resonate with all of the electrical impedances presented by tissue structures, whereby in accordance with the principle of electrical resonance to allow very small quantities of radio frequency current to penetrate and to saturate all tissue structures and finally to electrically stimulate intracellular and intercellular physical and chemical activity.

It is another object of the invention to provide an electrotherapeutic apparatus for generating a complete spectrum of radio frequency energy ranging from the very lowest radio frequency (200,000 cycles) to the ultra-high frequency range (1,000 megacycles), said spectrum occurring any number of times per second and including a multiplicity of fundamental frequencies, their harmonics, and unrelated intermodulation frequencies, said apparatus including a pulsed, interrupted or adjustable voltage changing power supply which energizes an oscillator having characteristics which function to produce a multiplicity of fundamental frequencies, their harmonics, and unrelated intermodulation frequencies, and radiating means for coupling the complete spectrum of radio frequency energy by direct contact or capacitive coupling to a human being, animal, or plant, to conduct radio frequency current in a uniform manner into diseased tissue structures of a human being, animal or plant and effect therapeutic stimulation to diseased tissue cells by means of a multiplicity of fundamental frequencies, their harmonics, and unrelated intermodulation frequencies. A current is conducted within the electrolytes and each cell of the body of a human being, animal or plant when the impedance of a cell structure equals a state of resonance and occurs at some instantaneous frequency or corresponding harmonic frequency, or at an unrelated intermodulation frequency produced by the apparatus. A range of frequencies distributed between 200 kilocycles and 1,000 megacycles satisfies the electrical impedance conditions presented by the biological media, causing a state of resonance of the biological media, thus, allowing for penetration and saturation of currents throughout the biological media, and producing a net stimulatory action on the biological media, caused by the effects of the conducting currents.

It is further an object of this invention to provide a novel and improved method for therapeutic treatment of diseased tissue structure in a patient's body comprising the steps of generating a complete spectrum of radio frequencies ranging from the lowest radio frequency to the ultra-high frequency range and including a multiplicity of fundamental frequencies, their harmonics, and unrelated intermodulation frequencies, coupling said spectrum of radio frequency energy to a patient's body, and resonating with each of the electrical impedances of the patient's cell structures to a state of resonance occurring with an instantaneous frequency of said spectrum to cause small quantities of electrical current to conduct within the electrolytes and each cell of the patient's body.

Other objects and advantages of the invention will be pointed out specifically or will become apparent from the following description when it is considered in conjunction with the appended claims and the accompanying drawings, in which:

FIG. 1 is a schematic diagram of apparatus arranged in accordance with the invention;

FIG. 2 is a fragmentary schematic detail, on an enlarged scale, of apparatus which may be included in the invention;

FIG. 3 is a diagrammatic view of the wave form produced by the portion of FIG. 1 indicated by the numeral 1;

FIG. 4 is a radio frequency carrier wave form produced from an oscillator unmodulated;

Figure 7:
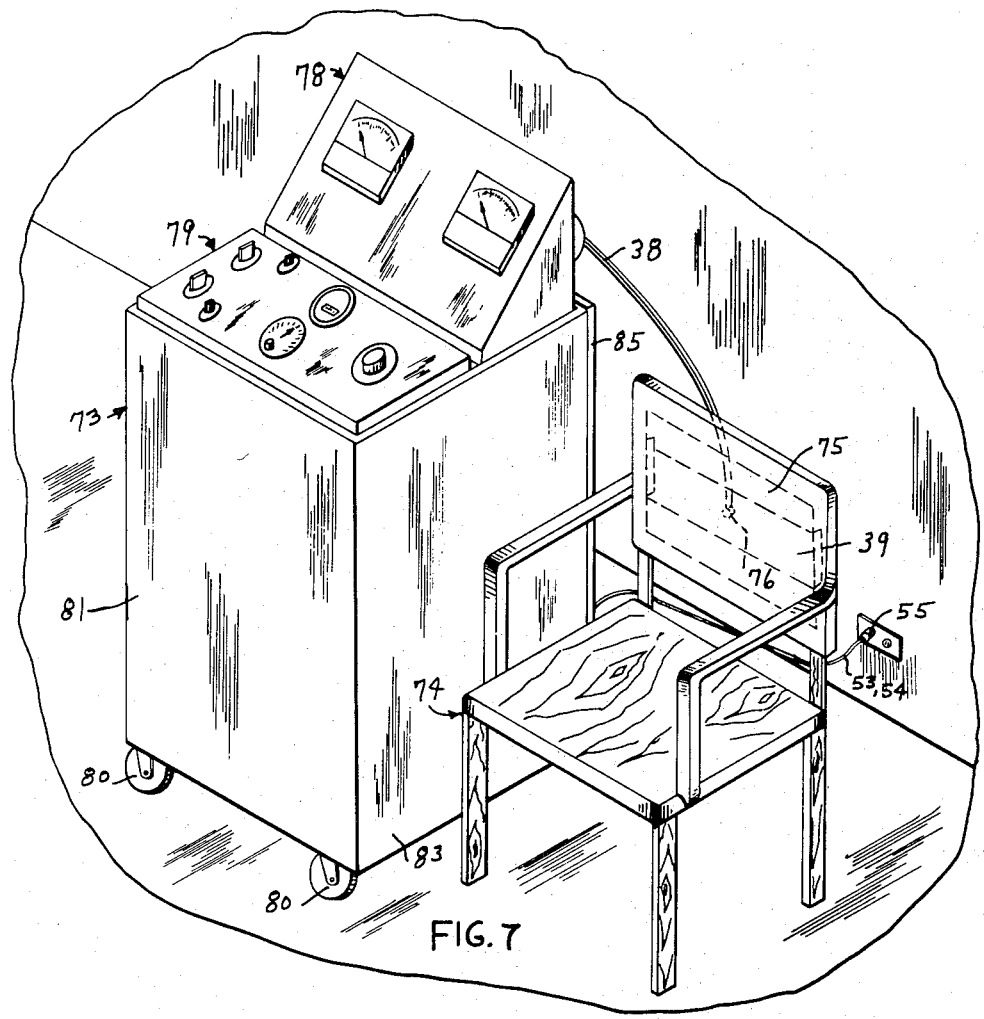
Figure 8:
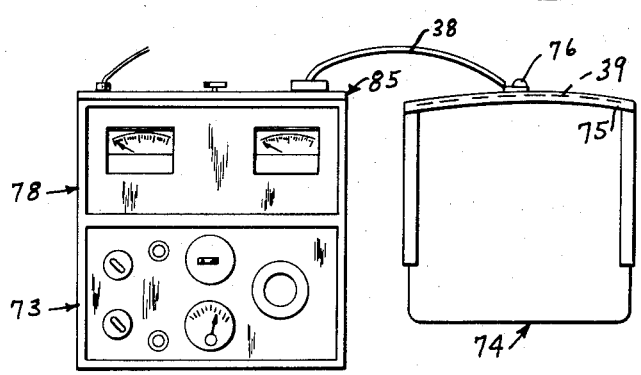
Figure 9:
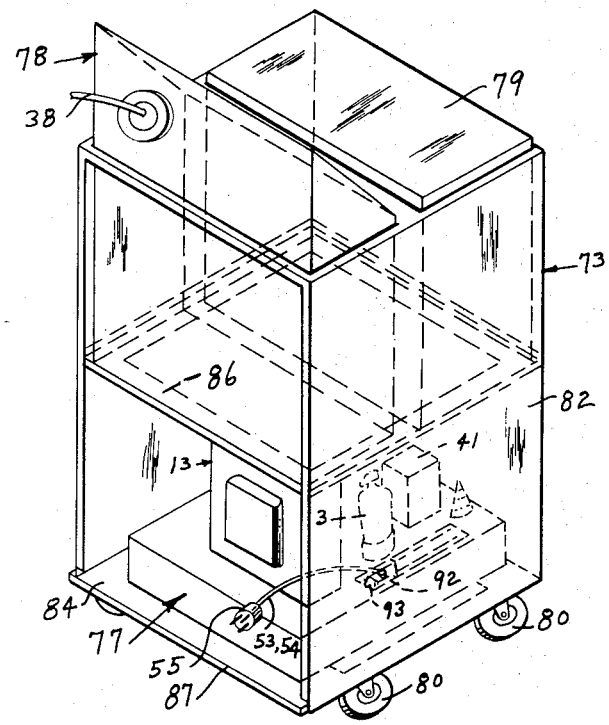
Figure 13:
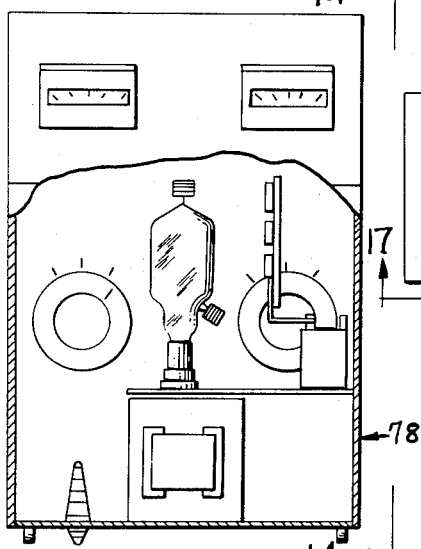
Figure 15:
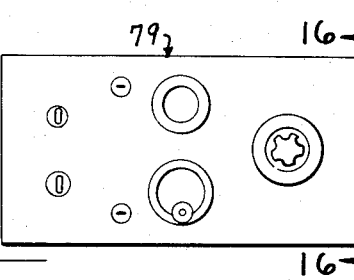
Figure 14:
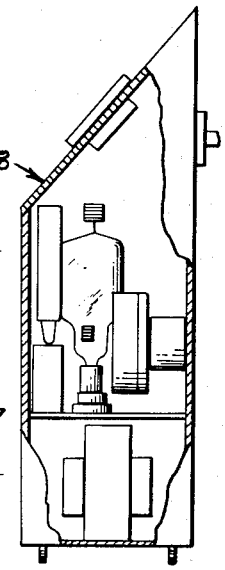
Figure 10:
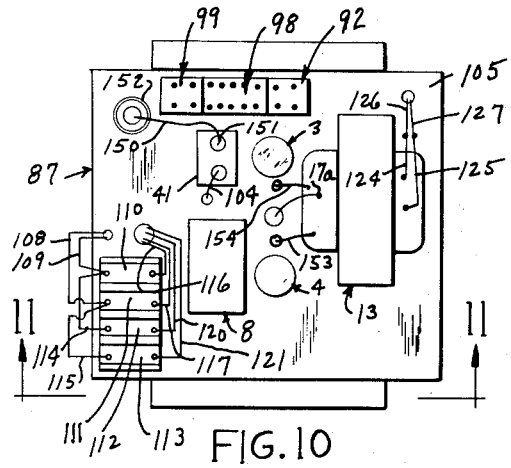
Figure 11:
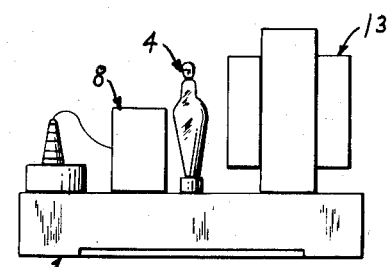
Figure 26:
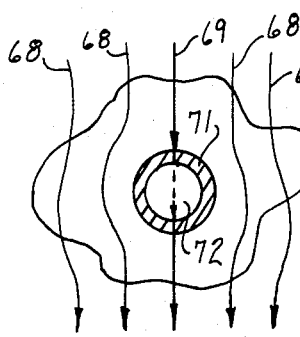
Figure 12:
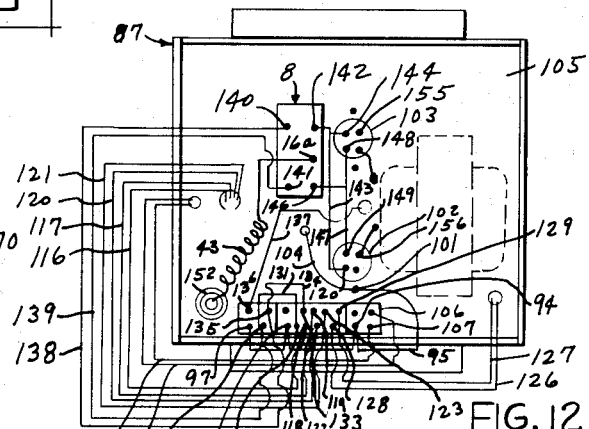
Figure 25:
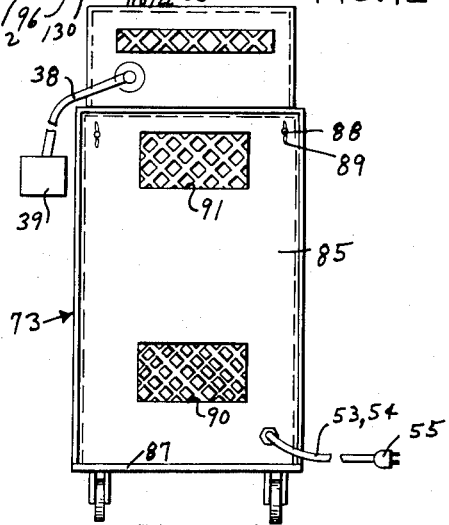
Figure 18:
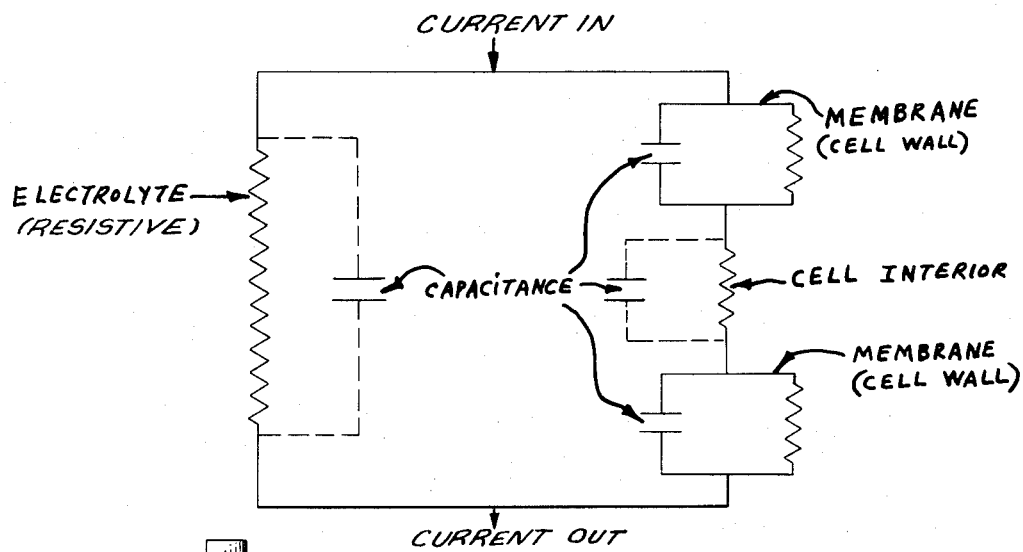
Figure 16:
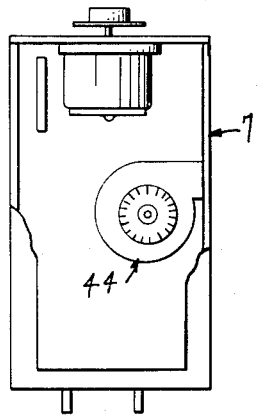
Figure 17:
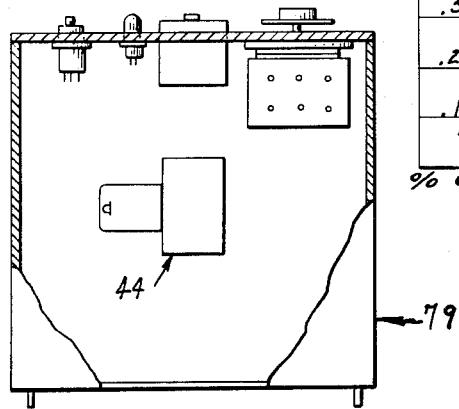
Figure 19:
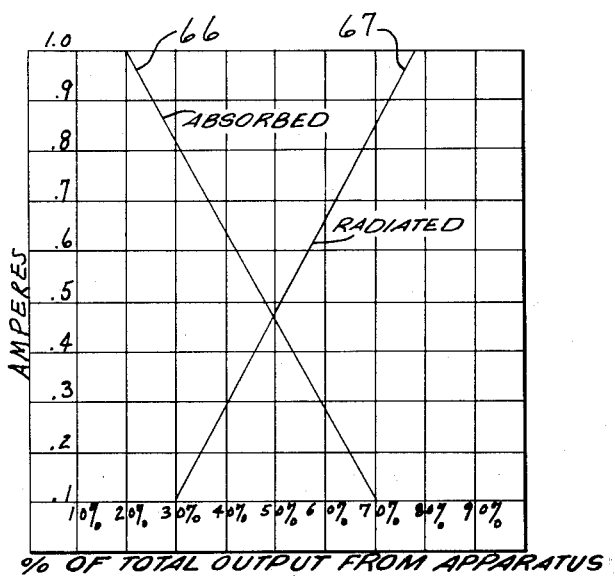
Figure 20:
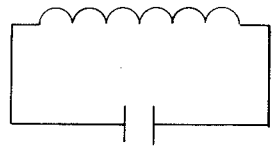
Figure 21:
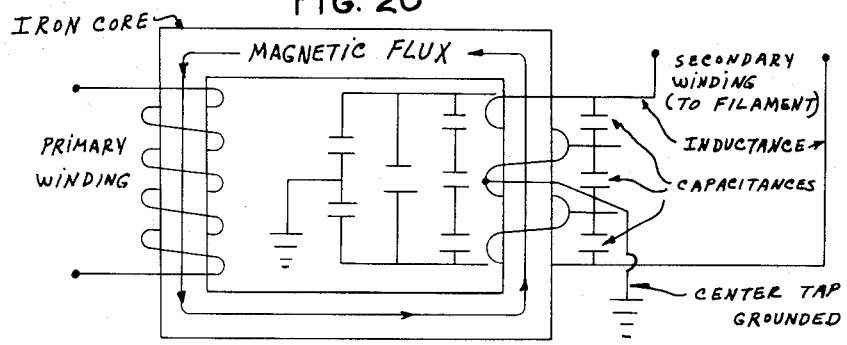
Figure 22:
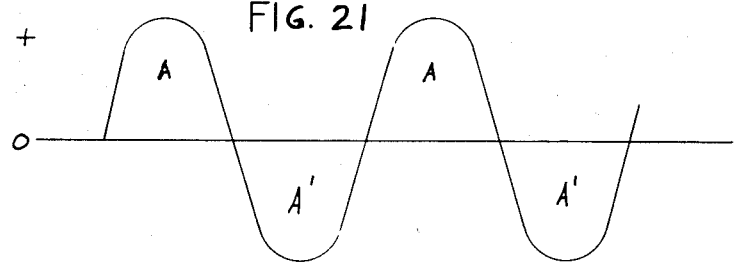
Figure 23:
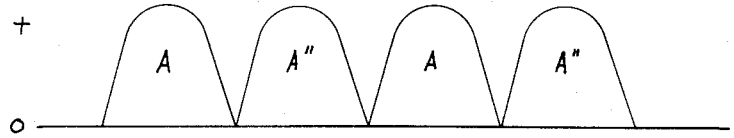
Figure 24:
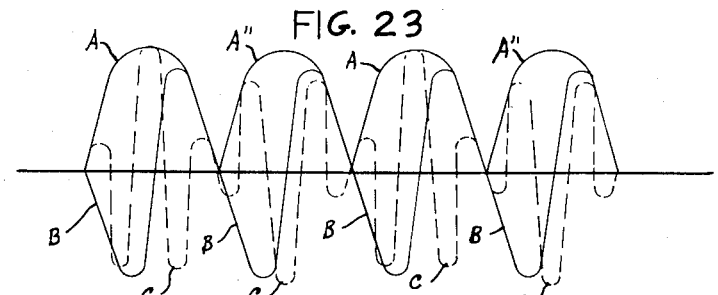

FIG. 5 is a radio frequency carrier, generating amplitude and frequency modulation from the portion of FIG. 1 indicated by the numeral 2, and is emitted from treatment electrode 39; also from treatment electrode 39e of FIG. 6;

FIG. 6 is a schematic diagram of a modified apparatus arranged in accordance with the invention;

FIG. 6A is a fragmentary schematic diagram of a slight modification of the apparatus illustrated in FIG. 6;

FIG. 7 is a front perspective view of the therapeutic apparatus made in accordance with the principles of the invention;

FIG. 8 is a top plan view of the structure illustrated in FIG. 7;

FIG. 9 is a rear perspective view of the apparatus illustrated in FIG. 7 and showing the back cover panel removed;

FIG. 10 is a top plan view of the power supply means illustrated in FIG. 9;

FIG. 11 is a side elevational view of the structure illustrated in FIG. 10, taken along the line 11—11 thereof, and looking in the direction of the arrows;

FIG. 12 is a bottom plan view of the structure illustrated in FIG. 10;

FIG. 13 is a front cabinet cutaway elevational view, with parts removed, of the oscillator structure of the machine shown in FIG. 7;

FIG. 14 is a side cabinet cutaway elevational view, with parts broken away, of the oscillator structure shown in FIG. 13, taken along the line 14—14 thereof, and looking in the direction of the arrows;

FIG. 15 is a top view of the control structure employed in the apparatus of FIG. 7;

FIG. 16 is an end cabinet cutaway elevational view of the structure illustrated in FIG. 15, taken along the line 16—16 thereof, and looking in the direction of the arrows;

FIG. 17 is a side elevational view, with the cabinet cutaway, with parts broken away, of the structure illustrated in FIG. 15, taken along the line 17—17 thereof, and looking in the direction of the arrows;

FIG. 18 illustrates an electrical circuit equivalent to the electrical circuit of animal tissue;

FIG. 19 is a graph showing the radio frequency energy absorbed by a patient in percent as related to atmospheric radiation;

FIG. 20 is a schematic circuit diagram of the tuned oscillator tank circuit employed in the present invention;

FIG. 21 is a schematic diagram of the transformer employed in the present invention to illustrate the inherent capacitances and inductances of the transformer;

FIGS. 22, 23 and 24 are diagrammatic views of wave forms produced by different parts of the apparatus illustrated in FIG. 6;

FIG. 25 is a rear elevational view of the cabinet shown in FIGS. 7 and 8; and,

FIG. 26 is a schematic illustration of current passing through tissue structure.

The human body consists of a composite mass of tissues which have electrical constants like any other substance or matter, that is, all of the tissues act as conductors of electricity to a varying extent. In human tissues all cells are bathed in lymph or other intercellular fluid and an electric current, in order to reach the cells, has to pass through this fluid. The tissue fluids consist of a solution of water, albumin, fibrin and salts. The problem of electrical conduction in the tissues can be regarded as a problem of conduction in an electrolytic solution of a complex character. An electrolytic solution contains dissociated atoms of the component particles of acids, bases and salts.

The flow of high frequency electrical energy through the body tissues varies with the frequency of the current. High frequency currents of long wave length and relatively low frequency encounter a "load" in tissues which is predominantly "resistive." High frequency currents of short wave length and relatively high frequency encounter a load which is primarily "capacitive."

An equivalent electrical circuit of human tissue is shown in FIG. 18. As shown in this figure, the electrolyte surrounding the cells is resistive. The cell electrical characteristics are illustrated as being in parallel with the characteristics of the electrolyte. The cell wall or membrane and the cell interior are each equivalent to a resistance and capacitance connected in parallel.

The values of capacitance and resistance are functions of cell shape radius and volume concentration. At low frequencies (below 300 megacycles) current tends to bypass the relatively high capacitance of the cell through the conductance of the electrolyte which surrounds it. As the capacitive reactance drops at higher frequencies, the current passes into the cell. At 300 megacycles, for example, the current would pass through cell membranes and nuclei. At 1,000 megacycles current conducts primarily at the skin surface. At 150 kilocycles current conducts through the solutions (electrolytes) of the body.

The following table demonstrates the specific resistance of human organs at various frequencies:

| Organ or tissue of the body | Measurements at 1,000,000 cycles, ohms | Measurements at 100,000 cycles, ohms | Measurements at 60 cycles, ohms | Measurements using direct current, ohms |
|---|---|---|---|---|
| Liver | | 230 | 1,600 | 8,000 |
| Spleen | | 230 | 2,100 | 7,700 |
| Muscle | 110 | 255 | 1,500 | 9,000 |
| Skin: | | | | |
| Dry | | 435 | 300,000 | 4,000,000 |
| Wet | | 435 | 250,000 | 380,000 |
| Fat | 2,180 | 2,700 | 3,250 | 108,000 |
| Lungs collapsed | | 485 | 1,825 | 5,400 |
| Bone (Tibia) | 1,800 | 12,300 | 15,400 | 22,500 |
| Kidney | 126 | 200 | 1,400 | 8,500 |
| Brain | | 630 | 2,170 | 10,700 |

Experimental and clinical work with electrical energy of high frequency has shown that this form of energy can pass through electrically non-conductive substances because dielectric-permeability or conductivity increases with the increase of the frequency of currents. The flow of an electrical force through the insulating or dielectric medium is known as a "capacitative" current in contrast to the "conduction" current through an ordinary electrical circuit at 60 cycles or with direct current. The unit of dielectric permeability is that of air under normal pressure. Body tissues and liquids transmit the electrical field force from 80 to 90 times better than air space. The dielectric constants of various substances are as follows:

Air _____ 1
Water _____ 80
Body tissues and liquids _____ 80–90

The relative fluid content of the human body varies considerably:

|  | Percent |
|---|---|
| Muscle _____(relatively low resistance)__ | 72–75 |
| Brain _____do____ | 68 |
| Fat _____do____ | 15 |
| Skin-bone _____do____ | 5–16 |

The properties of poorly conductive body tissues require very high frequency currents to be penetrable in regions which would otherwise be more or less inaccessible to a purely conductive current as a 60 cycle current or direct current. Hence, inner organs, as the spinal cord and the brain, are all closed off by poor conductors, as fat, bones, and so forth, and may have currents conducted through them only if sufficiently high frequency currents are applied to them.

The method of "tissue current penetration" embodied in the present invention can be expressed through an explanation of the electrical laws of resonance. Currents can be conducted through a circuit at the higest efficiency when the conditions of resonance occur. The resonant frequency, or the frequency at which inductive reactance $X_L$ equals capacitive reactance $X_c$, expressed by:

$$\text{Frequency} = \frac{1}{2\pi\sqrt{L \times C}}$$

will conduct current in the particular circuit at greatest efficiency.

The present invention provides a method and means to supply sufficient numbers of frequencies to meet all of the combinations of reactance and resistance, presented by living animal tissue. There are literally an infinite number of electrical circuits within human tissue and they require a range of frequencies to meet all the combinations of reactance and resistance, to permit efficient conduction of currents through, and in all structures of tissues within, a living human being or animal. These tissue electrical circuits all have a different electrical impedance and they will conduct radio frequency current at a maximum peaking level when the impedances of these many circuits are at resonance with the proper frequency.

Apparatus constructed in accordance with the invention is composed of two basic components, namely a low frequency, pulse voltage generator and a radio frequency voltage generator. The first of these components is indicated generally in FIG. 1 of the drawing by the reference character 1, and the second by the general reference numeral 2.

The low frequency, pulse voltage generator 1 is of a kind which is well known in the art and need be only briefly described. As shown, the generator 1 comprises two identical, half-wave rectifier tubes 3 and 4 of known construction, the filaments 5 and 6 of the two tubes being connected in parallel to the secondary winding 7 of a transformer 8 having its primary winding 9 adapted for connection to a source of electrical power, such as the 60 cycle house current commonly in use in this country. The plates 10 and 11 of the tubes 3 and 4 are connected to the terminals of the secondary winding 12 of the transformer 13, the primary winding 14 of which is connected to the output terminals of a variable auto-transformer 15 of known construction and available in the market under the name "Variac." The range of the transformer 15 may be adjustable continuously from 0 to 135 volts and it obtains its energy from a 120 volt, 60 cycle standard house current source. The input to the transformer 15 and thus the energy impressed on the plates of the tubes 3 and 4 through the transformer 13 may be the conventional 60 cycle voltage of sine wave characteristics, i.e., alternating positive and negative voltage values. Other frequenc may be used, however, in which case an appropriate frequency converter such as a motor generator, multi-vibrator, etc. must be provided to obtain these other frequencies. The rectified output of the tubes, when conventional 60 cycle current is used, is a low frequency pulse having 120 beat wave form similar to that depicted in FIGURE 3. The wave form produced by the generator 1 need not necessarily be restricted to the half loop arrangement just described, but may be changed where desired by the substitution for the arrangement shown of saw tooth, square wave, or other known wave form generators. The output of the tubes 3 and 4 is conducted along leads 16 and 17 which respectively are connected to center taps 16a and 17a of the secondary windings of the transformers 8 and 13. The lead 17 is directed through an ammeter 18, by means of which the current delivered from the generator 1 may be measured.

The generator 2 consists of an oscillator circuit composed of a number of elements including an amplifier tube 19 of the triode type, to the plate 20 of which the lead 16 is connected. The lead 17 from the power supply 1 is connected to a center tap 21 of the secondary coil 22 of a transformer 23, the terminals of the coil 22 being connected to the filament 24 of the tube 19. The primary coil 25 of the transformer 23 is adapted for connection to a conventional power source of the kind previously referred to.

The grid 26 of the tube 19 is connected by a wire 27 to one terminal 28 of a tank circuit 29 composed of a preferably variable (adjustable) capacitor 30 and a coil 31 connected in parallel, the other terminal 32 of the tank circuit being connected to the lead 16. From the point of connection of the grid 26 to the tank circuit 29 extends a wire 33 which also is connected to an inductive-resistor 34 which preferably is of a kind which may be varied between the limits of 0 to 2500 ohms. The inductive-resistor acts in the circuit as a variable resistance and it also has a variable inductive component. The inductive-resistor 34 is connected to ground through a radio frequency ammeter 35 which is useful not only in measuring the magnitude of the current in the tank circuit, but also in aiding in calibrating the oscillator circuit for maximum efficiency of operation. Moreover, the meter 35 is useful in measuring the radio frequency current from the tank circuit and the current from the grid 26 to ground. The meter 35 aids in calibrating the oscillator circuit and allows the operator to know the apparatus is functioning properly.

The grid 26 also is connected to a capacitor 36 and to a variable inductive-resistor 37, the latter parts connected in series so as to constitute a tunable network. Between the parts 36 and 37 is connected one end of a cable 38, to the other end of which is connected a thin, flexible metal electrode 39 which preferably is embedded in molded plastic not less than and not more than $\frac{1}{64}$ inch in thickness. Hereinafter, the electrode and its rubber covering will be referred to as the radiator or patient pad. The free terminal of the part 37 is connected to a wire 40 which is connected across the leads 16 and 17 through a capacitor 41.

In the operation of the parts described thus far, the components are connected as shown and described, and the several connections to the power source are made as described. For the purposes of this description, it will be assumed that the source comprises the 120 volt, 60 cycle power line which constitutes conventional house current in this country, but it will be understood that other and different energy sources may be used. Energy from the power source will pass first through the adjustable auto-transformer 15 which, as stated, conveniently may have a continuously adjustable range from 0 to its maximum output. Preferably, the transformer 15 is adjusted initially so that no voltage is applied through the transformer 13 to the plates of the rectifier tubes 3 and 4, and the inductive-resistor 34 is adjusted to maximum inductance and resistance. These components will later be manipulated to produce the desired reading on the ammeters 18 and 35. Power will be supplied through the transformer 8 to the filaments 5 and 6 of the rectifier tubes 3 and 4 and the required power will be supplied through the transformer 23 to the filament 24 of the oscillator tube 19. The supply of power to the oscillator filament 24 will result in charging of the capacitor 30 of the tank circuit 29. The components of the tank circuit are so selected, connected and adjusted that they will resonate at a specific predetermined frequency. This frequency, F, in cycles per second, can be calculated from the formula $$F = \frac{1}{2\pi\sqrt{L \times C}}$$

where:

$\pi = 3.14$;
$L$ = Inductance in henries; and
$C$ = Capacitance in farads.

Suppose, for example, that the capacitor 30 has been charged by the generator 1 through the oscillator tube. The energy stored in the capacitor is then $\frac{1}{2} CE^2$, where E is the maximum potential or voltage difference between its plates. At this instant, E has its maximum value, the current in the circuit is zero. The presence of the inductor 31 will allow the energy stored in electric field of the capacitor 30 to be transferred, and to form a magnetic field around inductor 31. The capacitor 30 then discharges until finally E becomes zero and the current, I becomes maximum. At the instant at which I is at the maximum, the energy in the magnetic field is $\frac{1}{2} LI^2$, all of the available energy is stored in the magnetic field, and there is no electric field on the capacitor 30. The process now reverses, the magnetic field collapses, and the energy is transferred back to the electric field of the capacitor. This process would repeat itself indefinitely if there were no loss of energy in the circuit and if there were no radiation, a subject to be considered subsequently.

For maximum flexibility of the apparatus, it is desirable that the capacitance of the tank circuit be variable. This may be accomplished either by the conventional variable capacitor 30 or by the provision of a number of capacitors 30$^a$-30$^d$ (FIGURE 2) arranged so as to be connected in parallel by manipulation of a pivoted tap changer 42. Each of the capacitors 30$^a$-30$^d$ may be of identical capacitance, but depending on the number of capacitors connected into the circuit, the frequency of the oscillator fundamental frequency having the greatest amplitude may be changed from one frequency to another frequency.

Since there are energy losses in the circuit and since radiation is desired, energy from an outside source must be supplied to the oscillator circuit. The additional energy is supplied from the generator 1 which is so connected to the oscillator circuit that the added energy equals that being lost, thereby permitting the oscillations to continue indefinitely. As has been pointed out previously, the leads 16 and 17 from the generator 1 are connected to the oscillator tube 19 so as to enable the latter to control the added energy as to phase and amplitude.

It has been found as a result of tests that one suitable oscillation frequency is 58 megacycles per second as the fundamental having the greatest amplitude. This frequency can be established and maintained if the capacity, $C_1$, of the capacitor 30 is .001 microfarad, the capacity, $C_2$, of the capacitor 41 is .01 microfarad, and if the inductance of the coil 31 is .0083 microhenries. Then, according to the above formula, the frequency, F, will be 58 megacycles per second. In this case, C may be calculated from the formula:

$$C = \frac{C_1 \times C_2}{C_1 + C_2}$$

The inductive-resistor 34 is used for the ground return of the tank circuit 29. The inductive-resistor 34 also serves to maintain a grid bias voltage on the grid 26. A small quantity of radio frequency energy from the tank circuit 29 returns to the grid where the proper radio frequency potential with the proper phase relationship must be maintained to control the periods at which the amplifier tube supplies the tank circuit with the required energy to maintain oscillation of the oscillator circuit. Thus, the inductive-resistor 34 is adjustable to permit proper control of the grid potential as required. The inductive-resistor 34 also is used in conjunction with the radio frequency ammeter 35 in maintaining control over the oscillator output.

The parts 36 and 37 constitute a network tunable by adjustment of the inductive-resistor 37 and are utilized in connecting the radio frequency supply to the patient's pad and cable 39 and 38, respectively. The self-inductance of the part 37 presents a relatively high inductive reactance value at the oscillator frequency, and therefore, connection of the patient's cable 38 between the parts 36 and 37 provides the required radio frequency power of approximately 10 average watts take-off at this point. The part 37 also provides the necessary radio frequency potential above ground at the point of connection of the cable 38 to transfer therapeutic energy in the form of radio frequency radiations to be applied to the patient. The location of the capacitor 36 couples it with both the tank circuit and grid circuit and provides a low capacitive reactance at the oscillator frequency, thus providing an excellent coupling network, and permits it to resonate with the oscillator tank circuit 29.

It is preferred that the part 37 have a low resistance value, e.g. on the order of one ohm. Thus, if either or both of the capacitors 30 and 36 should fail electrically, the maximum D.C. voltage which could appear at the point of the connection of the cable 38 with the remainder of the apparatus would be the product of the resistance and the surge current. The latter would have a value of about five amperes in the arrangement shown and described, and as a result, the possibility of subjecting a patient to harmful shocks or burns is extremely remote.

The function of the capacitor 41 is to minimize the passage of radio frequency energy from the oscillator component 2 to the power supply component 1. When connected as shown, the capacitor 41 presents a path to ground of lower impedance than does the circuit of the power supply 1 and, therefore, the radio frequency potential will be shunted to ground before it can reach other parts of the power supply 1. The capacitance of the capacitor 41 is not critical so long as it is not so great as to affect materially the pulse wave form characteristics produced at the output lead wire 16 of the generator 1.

As has been referred to previously, the wave form of the output of the generator 1 may be similar to the wave form disclosed in FIGURE 3. The wave form of the radio frequency output of the tank circuit 29 is illustrated in FIGURE 4, and the result of the modulation effects of the output of the generator 1 on the oscillator circuit is diagrammatically indicated in FIGURE 5. The latter figure represents the modulating effect the low frequency pulse voltage output of the generator 1 provides from radio frequency generator, e.g. a wave form of the energy which is radiated from the patient's pad 39 as discrete bursts of radio frequency modulated pulses when the invention consists of the parts arranged as shown and described.

Effective control over the energy radiated to the patient may be maintained by the operator through adjustment of the auto-transformer 15 and the parts 34 and 37. Changes made in the settings of these components will be reflected by changes in the readings of the ammeters 18 and 35. Variation of the output of the auto-transformer 15 naturally will affect the output of the power supply circuit 1 to the oscillator circuit, and the provision of a variable capacitor 30 will enable the frequency of the oscillator circuit output also to be controlled. Thus, apparatus constructed in accordance with the invention is capable of considerable variation, a feature highly desirable in machines of this kind. However, the instant apparatus is free from the objectionable and possibly harmful characteristics of some machines in that the instant apparatus does not subject the patient to possibly harmful electrical shocks or radio frequency burns.

FIG. 6 illustrates a schematic diagram of a modified apparatus arranged in accordance with the principle of the invention. The structure illustrated in FIG. 6 is substantially identical with the structure illustrated in FIG. 1 and the corresponding parts have been marked with the same reference numerals followed by the small letter "e." One difference is that in the circuit of FIG. 6, an air core high voltage inductor indicated by the numeral 43 has been inserted in lead wire 16e. The inductor 43 functions as a blocking inductor to the radio frequency energy produced in the oscillator circuit and prevents these currents from feeding back into the pulse rectifier system. The inductor 43 is 2½ millihenries in value.

The embodiment of FIG. 6 has been provided with a cooling fan generally indicated by the numeral 44 which is connected to a suitable power line source. Any suitable fan may be used. In one embodiment, a fan having a capacity of 100 cubic foot per minute was used.

Another difference between the embodiment of FIG. 6 and that of FIG. 1 is that the capacitor 41 in the circuit of FIG. 1 has been deleted. The embodiment of FIG. 6 has also been provided with four outlet plates or electrodes 39e to permit increased stimulating action over the affected area of the body of a patient. For example, the increased number of plates or pads 39e permits the treating of the patient over the liver area, the adrenals, spleen and the stomach area to stimulate an increase in the antigenic reactivity, improving the body's defenses to infections, and to increase the peripheral blood flow by way of nerve reflex action to the large arteries resulting in increased blood volume to the lower extremities of the body, and to increase the cortical activity in a patient's body from the adrenal cortex.

The transformer 23e is also provided with two suitable by-pass capacitors indicated by the numeral 45. These capacitors function to prevent the radio frequency currents from becoming too great in the transformer 23e and to prevent over-heating of the transformer winding but also to allow it to function as a high frequency resonant circuit. As shown in FIG. 6, the lead wires 46 and 47 of the primary coil of the transformer 8e are connected in parallel with the lead wires 48 and 49 of the primary coil of the transformer 25e. The last-mentioned lead wires are then connected by means of the lead wires 50 and 51 to a broad band line filter generally indicated by the numeral 52. The filter 52 is then connected by means of the lead wires 53 and 54 to the standard male line connector plug 55. The plug 55 is grounded as shown in FIG. 6. The filter 52 reduces the in-line interference which is in the line, and is constructed in accordance with the Federal Communication Commission's requirements for interference producing apparatus. The broad band line filter 52 is a conventional unit which is readily available on the market. One suitable filter apparatus of this type is that available on the market by the Cornell Dubilier Electronics Division of the Federal Pacific Electric Co. of Newark, New Jersey, model IF–19. All of the 120 volt power line source used by the apparatus illustrated in FIG. 6 is fed through the filter 52. The numeral 56 indicates a conventional panel light which is connected across the power input lead wires 53 and 54. The numeral 57 designates an in-line switch. The numeral 58 is an in-line fuse. A suitable fuse 58 is a 5 amp slow blow fuse having a dimension of ¼" by 1¼".

The embodiment of FIG. 6 is further provided with a patient timer, generally indicated by the numeral 59, which may be of any suitable type as, for example, an electrical timer which has a time range of from zero to 30 minutes. The numeral 60 generally indicates a suitable time accumulator which is operated electrically and which is adapted to read up to 9,999.9 hours. The timers 59 and 60 are connected across the power input lead wires 61 and 62 of the "Variac" transformer 15e.

It will be seen that when the patient timer 59 is actuated the necessary voltage and current will be fed through the adjustable transformer 15e which may be used to vary the amplitude of the power supply pulse. The voltage is stepped up to a point where it is equal to approximately 2500 volts on the secondary coil of the transformer 13e. The transformer 8e brings to incandescence the filaments of the tubes 3e and 4e and a rectified pulse wave form is fed through the transformer center tap 16ae through the inductor 43. The rectified pulse output peak voltage is approximately 2490 volts, and there is an approximate 10 volt drop across the tubes 3e and 4e. The high voltage inductor 43 functions to prevent radio frequency energy produced in the oscillator circuit from feeding back into the last-described pulse rectifier system.

The main tuning or resonating circuit is composed of the capacitor 30e and the inductance 31e. The capacitor 30e may be a plastic capacitor of 100 micro-microfarads at 15 kv. The inductance 31e is preferably a choke inductor of 2.5 millihenries at 1.0 ampere. The inductor 31e and the capacitor 30e comprise the maintenance circuit, and the fundamental frequency produced can be adjusted from 30 megacycles to 100 megacycles by changing the value of 31e. This particular feature of the oscillator circuit serves as one of the fundamentals. However, there are other fundamental frequencies which are being produced automatically in the oscillator circuits. There is a feed-back into the grid circuit. The feedback into the grid 26e through the illustrated arrangement of inductors and capacitors gives sufficient bias voltage with a suitable phase relationship to the grid circuit to keep sustained oscillation in the circuit.

The circuit arrangement of FIG. 6 provides a predominancy of frequencies which are not at the 100 megacycle fundamental, and a large range of harmonics is obtained because of the relatively low over-all impedance of the oscillator circuit. These fundamentals and harmonics are fed off directly through the line 38e and the pads 39e to the patient so as to impress the same voltages and currents on the patient's tissues. Other resonant circuits are provided by the combination of inductance inherent in the winding of the transformer 23e and the capacitances 45. Further capacitance exists between the transformer windings and layers. The last-mentioned elements, in combination with the capacitances, inductances and resistances of the wires of the oscillator circuit, result in other resonant circuits. Accordingly, it will be seen that there are several basic resonant circuits contained in the oscillator structure of FIG. 6. Another resonant circuit is in the area of the oscillator circuit which includes the adjustable inductors 34e and 37e which are combined with the capacitor 36e. It will be seen that as a variable voltage is fed into these circuits, either as the voltage to building up or collapsing, this action gives rise to the aforementioned various frequencies that are produced from the resonant circuits. It will be seen that there is produced automatically a complete spectrum of radio frequencies containing a high plurality of major and minor fundamentals, their harmonics and unrelated intermodulation frequencies. The main resonant circuit includes the filament transformer 23e and the main oscillator tube 19e, and when a resonant condition is set up in the main resonant circuit including the capacitor 30e and the inductor 31e, this action initiates resonances in the other resonant circuits because of the instantaneous change in the input voltage to the oscillator circuit from the power supply circuit.

In one operating embodiment employing the circuit of FIG. 6, the radio frequency voltage fed into the patient's circuit 38e and 39e varied between 10 to 20 volts at 100 megacycles. In that embodiment, this was the frequency having the greatest amplitude, and the other frequencies were suppressed so as to be lower in power output. It will be understood that the power output may be lower in some of the frequencies produced other than at 100 megacycles, and the range of 10 to 20 volts applies to the maximum amplitude at 100 megacycles produced in said working embodiment.

A low radio frequency voltage of this type permits the use of the apparatus in close contact with the patient so that the electrodes 39e may be in contact with the patient to reduce atmospheric radiation. It is desirable to feed a low energy field into the patient's body without extreme energy losses to the atmosphere to improve the efficiency of the method. On the other hand, when a few thousand volts are used at the point of application to the patient, the losses are increased because of the additional insulation needed to insulate the radiating source from the patient. The losses are inversely proportional to the square of the distance. Accordingly, with the apparatus of the present invention the electrode 39e may be made small and be in contact with the patient's skin because of the low voltage output of the apparatus. The electrodes 39e may be used without insulation, but as a practical matter a very thin insulation of about $\frac{1}{64}''$ thick is used, and it is placed directly on the body of the patient.

It will be understood that the spectrum of frequencies are produced because of the inherent characteristics of the apparatus of the present invention because the transformer 15e does not vary the characteristic wave form output of the energy generator means 1e, but merely sets up voltage limits in the circuit. The transformer 15e is adapted to vary the amplitude of the wave form output, but it does not vary the number of frequencies in the output of the apparatus. The spectrum of frequencies is produced in the apparatus of the present invention due to the voltage wave form characterists, thus, a pulse is produced from generator means 1e. A spectrum of frequencies is thus automatically produced due to the inherent structure of the apparatus. The same pattern or spectrum of frequencies occurs for each fluctuation of the power supply pattern of voltage which is 120 times a second. The energy input from the power supply generator means 1e is pulsed for the purpose of producing multiple frequencies from the oscillator circuit 2e and not to vary the duration of any single frequency at the output. In the apparatus of the present invention the period of no output from the generator means is approximately equal to the output period. This no output period allows for dissipation of heat due to the passage of current conducting in body tissues.

FIG. 6A is a fragmentary, schematic diagram of a modification of the circuit illustrated in FIG. 6. In this embodiment the inductance 31e was removed to permit the direct feeding of the radio frequency energy through the capacitor 30e into the patient circuit comprising the parts 28e, 38e and 39e. In the embodiment of FIG. 6, the inductor 31e functions as a series inductance which blocks the amount of current which could pass through the capacitor 30e. Accordingly, by removing the inductance 31e it is possible to drive more energy directly into the aforementioned patient's circuit. Another difference between the circuit of FIG. 6A and that of FIG. 6 is that the circuit of FIG. 6A is provided with the inductance 63 in series with the grid 26e which functions as a frequency changing method over the fundamental having the greatest amplitude. The fundamental frequency having the greatest amplitude can either be increased or decreased by changing the number of turns of the inductance 63. An optimum number of turns for the inductance 63 is made from number 13 round wire, wound on a ½" inside diameter form of nine turns which provides a fundamental frequency of 100 megacycles. Two inductances 64 and 65 have also been provided in the filament circuit of the oscillator tube 19e to isolate the radio frequency voltages to the filaments of this tube. The inductances 64 and 65 are preferably ten turn coil inductors using number 13 round wire made to ½" inside diameters. The inductances 63, 64 and 65 may be made from any suitable solid wire as, for example, No. 13 round American Wire Gage copper wire.

The aforedescribed various resonances in the apparatus of the present invention are widely separated in frequency and oscillate with differing strength as the power supply voltage fluctuates at its basic 120 cycle rate. These radio frequencies are all frequency modulated, and interact strongly to produce unrelated intermodulation frequencies over a large portion of the complete spectrum of the radio frequency band between 200 kilocycles and 1,000 megacycles. When the aforedescribed circuits of the present invention are supplied with a pulsed high voltage power supply they behave as follows: (1) The arrangement produces all the fixed frequencies of each fundamental resonant circuit. (2) All accumulated harmonics of each resonant fundamental frequency are produced. (3) Since all circuits are electrically connected and the voltage from the power supply is increasing from zero to maximum (120 times per second) there is produced unrelated intermodulation of frequencies giving rise to new frequencies which are not fundamental frequencies or any harmonics thereof, but are new frequencies containing their own harmonics. Through this method and process it makes it possible to get spectrums of frequencies from this structure with a simple one tube oscillator. Any other approach to get spectrums of frequencies would involve very complex circuits or complex mechanical switching systems of uneconomical proportions, therefore, the present invention provides one of the simplest methods possible to get spectrum frequency output for medical and other purposes.

The 120 cycle pulse frequency (from zero voltage to maximum 120 times per second) can be easily attained by converting 60 cycles through a conventional full wave rectifier system. 30 cycles, 50 cycles, 400 cycles or any special high voltage input (square wave, saw tooth, etc.), pulsed wave form arrangement to the tank circuit will perform approximately the same as the circuit demonstrated. At 30 cycles the number of times the spectrum of high frequencies would be generated is ½ that of 60 cycles, whereas at 400 cycles the high frequencies would be generated 6.666 times more frequently than at 60 cycles. It is also possible to produce many frequencies continuously from a similar tank circuit arrangement, but continuous multiple frequency output from a generator would be limited to a fundamental and its harmonic frequencies and the production of unrelated intermodulation frequencies would not occur because they are generated due to an increasing and decreasing of the pulsed power supply high voltage input to the tank circuit and this effect would be lost from the output of the system. Some of the frequencies are very short lived and occur at one instant at a specific point of the high voltage wave form as produced by the pulsed power supply. Each frequency produced by the oscillator occurs 120 times per second in the described circuit and must only have sufficient strengt hto cause penetration and conduction into the tissues and to effect a stimulating action.

The relationship of the amount of radio frequency energy which is absorbed by a patient's tissue and that which is radiated into the atmosphere is significant in determining the minimum amount of energy required of the generator to cause effective stimulation. This relationship shall be referred to as the "patient absorption factor." The "patient absorption factor" then is the radio frequency current measured from the oscillator to the patient electrode 39 by a thermal ammeter inserted in line 38. This measurement is made without the patient on electrode 39.

FIG. 19 is a graph of radio frequency current from the oscillator plotted against the energy absorbed by the patient. The left hand of the graph indicates the radio frequency current from the spectrum oscillator circuit to the patient electrode in amperes and with the current measured without the patient. The graph 66 indicates the percent energy absorbed by the patient. The graph 67 indicates the percent energy radiated to the atmosphere.

FIG. 19 indicates the abosrbed energy below .1 ampere approaches 70% by the patient, with 30% loss to the atmosphere. There are, however, several factors which preclude using levels below .1 ampere. The ability of the oscillator to perform efficiently requires that sufficient voltage be supplied to the oscillator circuit to get as many frequencies in the spectrum as possible and maintain circuit oscillation. It has been found that a small high voltage (below 500 volts) supplied from the power supply does not set up enough potential in the tank circuits to produce the unrelated intermodulation frequency effects, thereby leaving out some frequencies otherwise produced if sufficient voltage (above 500 volts) is available to the tank circuits. A radio frequency current .1 ampere and above produces every frequency the circuit arrangement is capable of generating. The practical limits used are between .1 and .3 ampere.

An average power of 10 watts output in controlled clinical investigation on patients with severe leg ulcers produced a maximum rate of healing and recovery, two-and-one-half watts produced no change, and fifteen watts did not accelerate healing rates over the 10 watt output.

Every attempt is made to supply the energy to the patient without directing or concentrating the energy to a point on the body surfaces. The complete spectrum radio frequency energy concept is to conduct this energy into the body through the cells and electrolytes (to saturate the tissues with small amounts of energy) to receive stimulation at a molecular level, therefrom. Any attempt to direct its conduction through the leg, arm, etc., would only reduce the energy in isolated tissues to a level where there is no energy or that the energy is not great enough to stimulate tissue structures, however, greater stimulation is brought about by concentrating energy over the liver, adrenals, spleen and so forth.

The output of the device into the patient is approximately .195 calorie per second or 71.7 calories per minute. A 20 minute treatment would allow 1,404 calories to be absorbed. Assuming the patient was of normal weight (150 pounds) a total temperature rise to the patient's body would increase .0375° Fahrenheit. Comparing a diathermy type treatment the same patient would require 160 watts input to the body tissues to raise the total body temperature 1.0° Fahrenheit, over the same 20 minute period. From the above observations it is logically concluded, thermal accumulation effect from the pulsed multiple radio frequency generator is absent.

The maximum voltage that can develop at the patient electrode 39 is as follows:

Direct current or 60 cycle—3 volts @ 3 amperes.
Radio frequency—measured with a vacuum tube voltmeter:
    at .150 R.F. ampere 65 R.F. volts;
    at .2 R.F. ampere 70 R.F. volts;
    at .3 R.F. ampere 75 R.F. volts;
    at .4 R.F. ampere 80 R.F. volts;
    at .5 R.F. ampere 85 R.F. volts.

At the voltage potentials outlined above either direct current, 60 cycle, or at the various radio frequency outputs can in no way subject the patient to detrimental or to dangerous high voltages. These dangers exist with most prior art utilizing low frequency, high frequency and ultra-high frequency apparatuses.

As illustrated in FIG. 21, the transformer 23 (23e) is an important part of the tank circuit and functions as a series parallel resonant circuit. The transformer is grounded at the center tap of the secondary winding. The transformer secondary winding having considerable inductance is designed and constructed to resonate when made an integral part of the entire circuit to provide in part a portion of the tank circuit and will produce minor fundamental frequencies as demonstrated by FIGS. 1 and 6. Schematically this transformer's secondary winding appears in FIG. 21.

FIG. 21 demonstrates capacitances shown and are actually the capacitances developed between turns and layers of the winding. The iron core affects the characteristics of the inductance. The inductive reactance and capacitive reactance of this winding behave as many tuned resonant circuits in the frequency range developed between 50,000 cycles to 1,000 megacycles.

Transformer 23 (23e) functions as a tuned circuit of many resonances, and requires insulating materials which are class "B," thermal classification 120° C. and "H," thermal classification 180° C., due to the dielectric heating of the transformer between turns, layers, windings and ground.

The apparatus of this invention has the wave form characteristics which are illustrated in FIGS. 21, 22, 23 and 24. FIG. 22 diagrammatically represents a 60 cycle per second wave form supplied to the apparatus at the variable transformer 15, and fixed plate transformer 13, which is impressed on the half wave rectifiers 3 and 4, their plates 10 and 11. The principle of full wave rectification displaces A', FIG. 22, to position A" in FIG. 23. The characteristic output from the power supply is demonstrated in FIG. 23.

The radio frequency content generated in each segment of the sine wave are demonstrated by B and C, FIG. 24. Each segment contains a number of radio frequencies which are both amplitude and frequency modulated, and interact strongly to produce unrelated intermodulation frequencies over a large portion of the spectrum of the radio frequency range of 200 kilocycles and 1,000 megacycles. Demonstration B is lower in frequency than is C. FIG. 24 illustrates the output radio frequency from the oscillator circuit to the patient electrode 39.

In FIG. 26, the numeral 70 designates the electrolyte which surrounds a cell, the numeral 71 designates a cell membrane and the numeral 72 designates a cell nucleus. The numeral 68 designates current lines having a frequency below 300 megacycles. Numeral 69 designates a current line wherein the frequency is above 300 megacycles and the current line is shown passing through the membrane 71, the nucleus 72, and out through membrane 71.

A treatment consists of the placement of several pads 39, 39e over various areas about the body for a total therapy time of 15 minutes. A single pad application for general treatment of the patient requires a longer time to be effective, as for example, a 20 minute treatment period. However, the method of the multiple pad application is preferably used. Two basic principles concerning the use of the apparatus of the present invention are as follows:

(1) Applicator pads 39, 39e are to be placed on the liver-spleen area and the adrenal area for increased stimulation to those organs for improvement of function and efficiency of the body's host defense mechanism.

(2) Additional applicator pads 39, 39e are to be placed on the affected areas for increased stimulation.

The use of the pulsed multiple radio frequency generator method of the present invention has proven its usefulness and effectiveness to produce the following results:

(1) Stimulant to body defenses.

(2) Increases peripheral blood flow without pyrexia.
(3) Reduces smooth and skeletal muscle spasms.
(4) Improves nerve chronaxie where there is no nerve injury or degenerative disease of a nerve system.

There are no known contraindications or side effects found with the use of the apparatus of the present invention. There are no high voltages contained in the patient circuits. Power levels are sufficiently low from the output of the apparatus so that radio frequency burns cannot result from its use.

Clinical testing has shown that the apparatus of the present invention is a valuable adjunctive in the treatment of infections, post operative tissue healing, arthritis, bursitis, muscle spasm, neurological diseases and indolent leg ulcers. The apparatus has been used as an adjunctive therapeutic method in the treatment of horses and other animals. However, since a horse has about seven times the blood and tissue of a human being, the treatment time is extended to approximately four times the treatment time for a person.

FIGS. 7 through 17, and FIGS. 25 and 6A illustrate some structural features of one embodiment of the invention. As shown in FIG. 7, the circuit structure of FIGS. 1, 6 and 6A would be incorporated into a suitable cabinet illustrated generally by the numeral 73. The patient pad lead wire 38 extends outwardly through the back of the cabinet structure 73 and it is connected to the radiator or patient pad 39 which is mounted in the back of the wooden chair generally indicated by the numeral 74. It will be understood that a plurality of electrodes as 39e may be used. It will be seen that the radiator or electrode 39, as illustrated, is not in engagement with the body of the patient and the patient need not disrobe for a treatment. The radio frequency energy emanated by the radiator 39 is applied to the patient by an "electro-static coupling" and it is not localized to any specific area of the patient's body. This method of capacitive coupling permits free distribution of the emanated energy within the body. The voltages and power emanated from the apparatus are sufficiently low that no electrical shock or radio frequency burns can result. The electrode 39 may be of any suitable size and type. As for example, it may be made as a plate from 14 gauge hot rolled steel and of a size $8\frac{5}{16}"$ x 14". The plate may be nylon covered and secured by any suitable means, as by screws or the like, to the frame of the chair 74 behind the padding 75. A $\frac{3}{8}"$ x 1" long bolt 76 may be welded to the back of the plate 39 to provide a means for connecting the outer end of the cable 38 to the plate 39. In the illustrative embodiment, the electrode lead wire 38 is an electrical conductor of insulated wire, 7 feet in length.

Referring to FIGS. 7, 8 and 9, it will be seen that the operating structure of the illustrative embodiment is grouped into three general chassis or units, and for service requirements, each chassis is made as a separate and complete unit. In FIGS. 9, 10, 11 and 12, the numeral 77 generally indicates the power supply chassis. In FIGS. 7, 8, 9, 13 and 14, the numeral 78 generally indicates the oscillator chassis. In FIGS. 7, 8, 9, 15, 16 and 17, the numeral 79 generally indicates the power control chassis. Each of the aforementioned chassis is plugged together electrically by several terminal quick disconnectors, and these chassis are mounted in the outer cabinet 73 as shown in FIGS. 7, 8 and 9. The compartmentalized construction is preferred because it provides ease of manufacture, more effective and faster field servicing. It prevents the power control chassis 79 and the power supply chassis 77 from getting radio frequency energy into its components. It restrains atmospheric radiation to a minimum and the power line radiation is effectively eliminated. The double shield provided by the outer cabinet and the component cabinet provides attenuation of atmospheric radiation of 60 or better of emanations inside the cabinet from the oscillator cubical.

The cabinet 73 may be made from any suitable material, as for example, sixteen gauge hot rolled steel with the various panels being fixedly connected together by any suitable means as by welding. As shown in FIGS. 7 and 9, the cabinet may be provided with suitable rollers or wheels 80. The cabinet 73 would comprise the front panel 81, the left side panel 82 and the right side panel 83. The lower end of the cabinet is enclosed by the bottom wall 84 to which is attached the wheels 80. The back of the cabinet is enclosed by a removable panel 85, as shown in FIGS. 7 and 8. As shown in FIG. 9, the power supply chassis 77 is adapted to be seated on the bottom wall 54. The upper end of the cabinet 73 is open and is adapted to receive the oscillator chassis 78, and the power control chassis 79. The cabinet is provided with the inwardly extended flange 86 on the inside thereof at an intermediate point for supporting the oscillator chassis 78 and the power control chassis 79. As shown in FIG. 25, the lower end of the removable back wall 85 is seated within the retainer flange 87 and the upper end of the wall 85 is secured in place by any suitable means as by the bolts 88 and the wing nuts 89. The removable back wall 85 is provided with suitable openings as 90 and 91 for cooling purposes.

The power supply chassis 77 is illustrated in detail in FIGS. 10, 11 and 12. The power supply comprises a full wave rectifier using two gaseous half wave rectifiers 3 and 4. The gaseous rectifiers 3 and 4 may be of any suitable type and are used to minimize the voltage drop across the plates and filaments of the tubes regardless of the current requirement of the circuit. The transformer 13 is a 1½ k.v.a. transformer, 2,500 volts, which is connected to a 110 volt alternating current power source when in use. The transformer 13 is selected or designed so as to have 50% reserve kilo-volt ampere rating above the oscillator circuit requirement. The flux density in the core of the transformer 13 is maintained at a low level to take advantage of the linear effects of core iron properties. A transformer of this type restricts to a minimum any distortion to the incoming sine wave.

The power supply chassis 77 is designed to take advantage of the best thermal considerations as well as ideal electrical considerations for longer component life and more efficient performance. The power supply chassis is provided with a cabinet made from any suitable material, as for example, 18 gauge cold rolled sheet metal. The various components of the power supply chassis are secured to the power supply cabinet by any means, as by suitable bolts.

As shown in FIGS. 7 and 25, the apparatus of the present invention is provided with a three-wire grounded type power input cable 53, 54 which is provided with a three-wire grounded type plug 55 for insertion into a conventional wall receptacle for connection to a 120 volt power supply. The input cable 53, 54 is preferably of 600 volt insulation, electrical value and made to a length of twelve feet. As shown in FIGS. 9 and 10, the power supply chassis is provided with a first four-prong plug receptacle 92 which is adapted to receive the four-contact plug 93 mounted on the inner end of the power input cable 53, 54. One of the cables in the power input cable 53, 54 is a ground cable and it is connected through the plug 93 to the male contact stud 94 of the plug 93.

The ground prong 94 is connected by means of the ground wire 95 to the male contact studs 96 and 97 on the plugs 98 and 99, respectively. The ground wire 95 is also connected to anchor bolt 101 of the tube socket 102. The tube sockets 102 and 103 are adapted to receive the half-wave rectifier tubes 3 and 4, respectively. The plug 98 is a ten-contact male plug for connecting the oscillator chassis 78 to the power supply chassis 77. The plug 99 is a four-contact male plug for connecting the power control chassis 79 to the power supply chassis 77. The ground wire 95 is a No. 14 insulated wire which is 18½" long.

A ground wire 104 is connected at one end thereof to the anchor bolt 101 and at the other end thereof to the terminal of the capacitor 41. The ground wire 104 extends through a suitable hole in the power supply chassis base plate 105 and this wire is a No. 14 insulated wire and is 4¾" long.

The two power lines in the cable 53, 54 are connected to the male contact studs 106 and 107 of the plug 93. As shown in FIGS. 10 and 12, the male contact studs 106 and 107 are connected by means of the wires 108 and 109, respectively, to one end of the fuses 110 and 111, respectively. The wires 108 and 109 extend through a suitable opening in the plate 105 so as to be connected to the fuses which are located on the upper side of the plate 105. The wires 108 and 109 are each made from insulated No. 14 wire and they are 26" and 25" in length, respectively. One end of each of the fuses 110 and 111 is connected in parallel with one of the ends of the fuses 112 and 113 by means of the jumper wires 114 and 115, respectively. The wires 114 and 115 are No. 14 insulated wires of a length of 4⅜". The fuses 110 and 111, 112 and 113 are 10 amp. fuses.

The other ends of the fuses 110 and 111 are connected by means of the lead wires 116 and 117 to the prongs 118 and 119, respectively, on the ten-prong plug 98. The other ends of the fuses 112 and 113 are connected by means of the lead wires 120 and 121 to the male contact studs 122 and 123, respectively, on the oscillator chassis plug 98. The lead wires 116, 117, 120 and 121 are all made from No. 14 insulated wire and are made to a length of 27", 26½", 25½" and 24½", respectively. As shown in FIG. 10, the transformer 13 is provided with two 4½" long high-voltage lead wires 124 and 125 which are connected to the lead wires 126 and 127, respectively. The lead wires 126 and 127 extend through a suitable hole in the chassis plate 105 and are connected to the male contact studs 128 and 129 on the oscillator chassis plug 98. The lead wires 126 and 127 are 16½" long, and are made from No. 14 insulated wire. The male contact stud 130 on the oscillator chassis plug 98 is connected by means of the lead wire 131 to the male contact stud 132 on the power control chassis plug 99. Male contact stud 133 on the oscillator chassis plug 98 is connected by means of the lead wire 134 to the male contact stud 135 on the power control chassis plug 99. The lead wires 131 and 134 are each 4¼" long and are made from a No. 14 insulated wire.

The male contact stud 136 of the power control chassis plug 99 is connected by means of the lead wire 137 to the center low voltage tap 17a of the transformer 13. The lead wire 137 is 95" long and is made from a No. 10 insulated wire. The male contact studs 132 and 135 on the power control chassis plug 99 are connected by means of the lead wires 138 and 139 to the terminals 140 and 141 of the primary winding of the transformer 8. The lead wires 138 and 139 are 23" long and are made from a No. 14 insulated wire. The terminal 142 of the secondary winding of the transformer 8 is connected by means of the lead wire 143 to one terminal 144 of the filament member 5 in the rectifier tube 3 and to one filament terminal 145 of the rectifier tube 4. The lead wire 143 is 8¾" long and is made from a No. 10 insulated wire. The other terminal 146 of the secondary winding of the transformer 8 is connected by means of the lead wire 147 to the other terminal 148 of the rectifier tube 3 and the terminal 149 of the rectifier tube 4. The lead wire 147 is 6¾" long and is made from a No. 10 insulated wire. The center tap 16a of the secondary winding of the transformer 8 is connected by means of the aforementioned inductor coil 43 to the lead wire 150 which is connected to the plate 151 of the capacitor 41. The lead wire 150 passes through the insulator 152 mounted in the chassis plate 105. The lead wire 150 is 4½" long and is made from No. 10 insulated wire. The transformer 13 is provided with the low voltage leads 153 and 154 which are connected to the female contact 155 of the socket 103 and to the female contact 196 of the socket 102, respectively, for connecting the plates 10 and 11 of the rectifier tubes 3 and 4 to the coil 12 of the transformer 13. The leads 128 and 129 are 3½" long.

In a typical treatment, a patient will be so placed relatively to the pad 39 that the latter is in engagement with the body of the patient. It is not necessary that the patient disrobe; it is sufficient if the pad is placed on the back of a chair in which the patient is seated separating the patient and the metal portion of the electrode so as to produce a spacing of not more than ⅛". The meter 35 will give an indication of the output of the oscillator circuit, therefore, the intensity of radiation can be maintained at 10 average watts of output, thereby producing the desired therapeutic effects. A simple test may be performed to check the sufficiency of the radio frequency energy radiated to the patient. Such a test may comprise the holding by the patient of a common fluorescent tube, such as the 15 watt conventional side, while he is seated in the treatment chair in contact with the pad 39. He then is instructed to touch the cable 38 with the tube until it glows. Then, he moves the tube slowly away from the cable, still holding it, and if the area near his hand remains illuminated, the test indicates there is sufficient radio frequency energy in the patient to maintain ionization of the gases in the tube from the hand of the patient and output lead.

It is preferred that the initial treatment period be comprised of daily treatments of 15 to 30 minutes duration. A patient is likely to experience a reaction of general muscular soreness, but this reaction will pass with succeeding treatments. A soreness reaction is, in part, due to the detoxification process of the patient's body. Some patients experience a sensation tingling in the areas of the legs or the arms.

This is due to sensory nerve registration and reported by the patient. The reaction is due to fluid volume changes taking place in the arms and legs because of the increase of peripheral blood flow and circulation. Since this sensation is quite sublimital, some patients are not aware of the changes taking place in the peripheral blood circulation and the tingling sensation is not reported by some patients undergoing treatment.

The working embodiment of the invention is available on the market under the tradename "Spectrowave," and it is sold by the Biocytronics Corporation, 29 North Broadway, Des Plaines, Illinois.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A therapeutic method for the treatment of diseased tissue structure in a body comprising the steps of electronically generating a complete spectrum of radio frequency energy ranging from 200 kilocycles to 1,000 megacycles, including a multiplicity of fundamental frequencies, their harmonics, and unrelated intermodulation frequencies, by a pulsed voltage changing power supply energizing an oscillator having characteristics operable to produce automatically a multiplicity of fundamental frequencies, their harmonics, and unrelated intermodulation frequencies; coupling said complete spectrum of radio frequency energy to the body through electrode means, thereby setting up conditions necessary for, and resonating with each of the electrical impedances of the cell structures of the body with an instantaneous frequency contained in said complete spectrum of frequencies, and thereby allow small quantities of electrical current to conduct within the electrolytes and each of the body to obtain therapeutic electrical stimulation from the multiplicity of fundamental frequencies, their harmonics, and unrelated intermodulation frequencies.

2. A therapeutic method for the treatment of diseased tissue structure in a body comprising the steps of, electronically generating a complete spectrum of radio frequency energy ranging from 200 kilocycles to 1,000 megacycles, including a multiplicity of fundamental frequencies, their harmonics, and unrelated intermodulation frequencies; coupling said complete spectrum of radio frequency energy to the body through electrode means, thereby setting up the conditions necessary for, and resonating with each of the electrical impedances of the cell structures of the body with an instantaneous frequency contained in the complete spectrum of frequencies, and thereby allow small quantities of electrical current to conduct within the electrolytes and each cell of the body.

3. A therapeutic method for the treatment of diseased tissue structure in a body comprising the steps of, electronically generating a complete spectrum of radio frequencies, ranging from 200 kilocycles to 1,000 megacycles including multiplicity of fundamental frequencies, their harmonics, and unrelated intermodulation frequencies, occurring, 120 times a second; and, coupling said complete spectrum of radio frequencies to the body through electrode means to effect radio frequency current distribution in the tissues and the electrolytic solutions of the body to provide beneficial therapeutic stimulation.

4. A therapeutic method for the treatment of diseased tissue structure in a body comprising the steps of, electronically generating a pulsed, multiple radio frequency energy, distributed between 200 kilcycles and 1,000 megacycles including a multiplicity of fundamental frequencies, their harmonics, and unrelated intermodulation frequencies; coupling said pulsed, multiple radio frequency energy to the body through electrode means; and, passing the pulsed, multiple radio frequency energy, into the body to conduct current into the tissues, cells, and at sub-cell levels of the body, based on the natural electrical characteristics presented by the tissues, cells, and sub-cells to provide beneficial therapeutic stimulation.

5. A therapeutic method for the treatment of diseased tissue structure in a body comprising the steps of, electronically generating a pulsed, multiple radio frequency energy, distributed between 200 kilocycles and 1,000 megacycles including a multiplicity of fundamental frequencies, their harmonics, and unrelated intermodulation frequencies; coupling said pulsed, multiple radio frequency energy to the body through electrode means; and, passing the pulsed, multiple radio frequency energy, at a low energy level into the body to conduct current into the tissues, cells, and at sub-cell levels of the body, based on the natural electrical characteristics presented by the tissues, cells, and sub-cells, to provide beneficial therapeutic stimulation.

6. A radio frequency apparatus for administering therapeutical treatments comprising: an oscillator means for electronically generating a complete spectrum of pulsed multiple radio frequencies, ranging from 200 kilocycles to 1,000 megacycles including a multiplicity of fundamental frequencies, their harmonics, and unrelated intermodulation frequencies; a fluctuating pulsed power supply means connected to the oscillator means to excite the oscillator means and initiate said multiple pulsed frequencies and to modulate the same, and to cause increased numbers of frequencies between said 200 kilocycles and 1,000 megacycles which are not fundamentals or harmonics of the fundamentals normally generated by the oscillator circuit due to intermodulation effects of frequencies; and, means including electrode means, connected to the oscillator means for applying the complete spectrum of pulsed multiple frequencies to living cells and living tissue structures to resonate with the electrical impedance characteristics of the living cells and living tissue structures and effect an electrical current through the living cells and living tissue structures and provide beneficial electrical stimulation thereof.

7. A radio frequency apparatus for administering therapeutical treatments comprising: an oscillator means for electronically generating a complete spectrum of pulsed multiple radio frequencies, ranging from 200 kilocycles to 1,000 megacycles, including a multiplicity of fundamental frequencies, their harmonics, and unrelated intermodulation frequencies; said oscillator means including a tank circuit means having a plurality of resnant circuits which are widely separated in frequency; a fluctuating pulse energy generator means connected to the oscillator means to excite the resonant circuits which oscillate with differing strengths as the pulse energy fluctuates and initiate said multiple pulsed frequencies and modulate the same, and to cause increased numbers of frequencies between said 200 kilocycles and 1,000 megacycles which are not fundamentals or harmonics of the fundamentals normally generated by the oscillator circuit due to intermodulation effects of frequencies; and, means, including electrode means, connected to the oscillator means for applying the complete spectrum of pulsed multiple frequencies to living cells and living tissue structures to resonate with the electrical impedance characteristics of the living cells and living tissue structures and effects an electrical current flow through the living cells and living tissue structures and provides beneficial electrical stimulation thereof.

8. A radio frequency apparatus for administering therapeutical treatments comprising: an oscillator means for electronically generating a complete spectrum of pulsed multiple radio frequencies, ranging from 200 kilocycles to 1,000 megacycles, including a multiplicity of fundamental frequencies, their harmonics, and unrelated intermodulation frequencies; said oscillator means including a tank circuit means having a plurality of resonant circuits which are widely separated in frequency; a fluctuating pulse low frequency power supply energy generator means connected to the oscillator means to excite the resonant circuits which oscillate with differing strengths as the low frequency pulse energy fluctuates and initiate said multiple pulsed frequencies and modulate the same, and to cause increased numbers of frequencies between said 200 kilocycles and 1,000 megacycles which are not fundamentals or harmonics of the fundamentals normally generated by the oscillator circuit due to intermodulation effects of frequencies; the complete spectrum of radio frequencies in the oscillator generated wave form output being frequency modulated and amplitude modulated; and, means, including electrode means, connected to the oscillator means for applying the complete spectrum of pulsed multiple frequencies to living cells and living tissue structures to resonate with the electrical impedance characteristics of the living cells and living tissue structures and effect an electrical current flow through the living cells and living sissue structures and provide beneficial electrical stimulation thereof.

9. A radio frequency apparatus as defined in claim 8, wherein: said fluctuating pulse low frequency power supply energy generator means includes a variable transformer for connecting the power supply energy generator means to a 120 volt power source and for varying the amplitude of the wave form output of the power supply energy generator means.

10. A radio frequency apparatus for administering therapeutical treatments comprising: an oscillator means for electronically generating a complete spectrum of pulsed multiple radio frequencies, ranging from 200 kilocycles to 1,000 megacycles, including a multiplicity of fundamental frequencies, their harmonics, and unrelated intermodulation frequencies; said oscillator means including a tank circuit means having a plurality of resonant circuits which are widely separated in frequency; a fluctuating pulse power supply energy generator means;

means for feeding the output of said generator means to the oscillator means to excite the resonant circuits which oscillate with differing strengths as the pulse energy fluctuates and initiate said multiple pulsed frequencies and modulate the same, and to cause increased numbers of frequencies between said 200 kilocycles and 1,000 megacycles having wave form characteristics similar to the output of the power supply energy generator means, which are not fundamentals or harmonics of the fundamentals normally generated by the oscillator circuit, including electrode means, and, means due to the intermodulation effects of frequencies connected to the oscillator means for applying the complete spectrum of pulsed multiple frequencies to living cells and living tissue structures to resonate with the electrical impedance characteristics of the living cells and living tissue structures and effect an electrical current flow through the living cells and living tissue structures and provide beneficial electrical stimulation thereof.

11. A radio frequency apparatus for administering therapeutical treatments comprising: an oscillator means for electronically generating a complete spectrum of pulsed multiple radio frequencies, ranging from 200 kilocycles to 1,000 megacycles, including a multiplicity of fundamental frequencies, their harmonics, and unrelated intermodulated frequencies; said oscillator means including a tank circuit means having a plurality of resonant circuits which are widely separated in frequency; a fluctuating pulse low frequency power supply energy generator means connected to the oscillator means to excite the resonant circuits which oscillate with differing strengths as the low frequency pulse energy fluctuates and initiate said multiple pulsed frequencies and modulate the same, and to cause increased numbers of frequencies between said 200 kilocycles and 1,000 megacycles which are not fundamentals or harmonics of the fundamentals normally generated by the oscillator circuit due to intermoduation effects of frequencies; the complete spectrum of radio frequencies in the oscillator generated wave form output being frequency modulated and amplitude modulated; a radio frequency blocking inductance means interconnected between the oscillator means and the pulsed power supply energy generator means; and, means, including electrode means, connected to the oscillator means for applying the complete spectrum of pulsed multiple frequencies to living cells and living tissue structures to resonate with the electrical impedance characteristics of the living cells and living tissue structures and effect an electrical current flow through the living cells and living tissue structures and provide beneficial electrical stimulation thereof.

References Cited by the Examiner

UNITED STATES PATENTS

| | | | |
|---|---|---|---|
| 1,425,743 | 8/1922 | Baruch | 128—422 |
| 2,099,511 | 11/1937 | Caesar | 128—423 X |
| 2,276,995 | 3/1942 | Milinowski | 128—423 |
| 2,381,496 | 8/1945 | Hansell | 128—422 X |
| 2,416,307 | 2/1947 | Grieg. | |

RICHARD A. GAUDET, *Primary Examiner.*

WILLIAM E. KAMM, *Assistant Examiner.*